(12) United States Patent
Czysz

(10) Patent No.: US 6,807,927 B2
(45) Date of Patent: Oct. 26, 2004

(54) PISTON ENGINE WITH COUNTERROTATING CRANKSHAFTS

(75) Inventor: Michael Czysz, Milwaukie, OR (US)

(73) Assignee: Leatherman Tool Group,. Inc., Portland, OR (US)

(*) Notice: Subject to any disclaimer, the term of this patent is extended or adjusted under 35 U.S.C. 154(b) by 0 days.

(21) Appl. No.: 10/402,093

(22) Filed: Mar. 28, 2003

(65) Prior Publication Data
US 2004/0187812 A1 Sep. 30, 2004

(51) Int. Cl.⁷ .................................................. F02B 79/20
(52) U.S. Cl. ...................................... 123/59.6; 180/219
(58) Field of Search ............................ 123/59.6, 52.4, 123/52.6; 180/219

(56) References Cited

U.S. PATENT DOCUMENTS

| 4,683,721 A | 8/1987 | Shin et al. ..................... 60/527 |
| 4,898,041 A | 2/1990 | Islas ............................... 74/44 |
| 4,979,476 A | 12/1990 | Islas ........................ 132/192 B |
| 5,014,655 A * | 5/1991 | Ampferer ................. 123/90.31 |
| 5,595,147 A | 1/1997 | Feuling ..................... 123/52.4 |
| 5,873,332 A * | 2/1999 | Taue et al. ................. 123/52.4 |
| 6,223,711 B1 | 5/2001 | Pelz ......................... 123/193.6 |
| 6,341,583 B1 | 1/2002 | Ryu ........................... 123/54.4 |

\* cited by examiner

*Primary Examiner*—Andrew M. Dolinar
*Assistant Examiner*—Katrina Harris
(74) *Attorney, Agent, or Firm*—Chernoff, Vilhauer, McClung & Stenzel, LLP (57) ABSTRACT

A multi-cylinder reciprocating-piston engine with two crankshafts located generally end-to-end with respect to each other and with power output ends of the crankshafts located adjacent each other and mechanically interconnected with each other so they rotate at equal speeds but in opposite directions. Pairing of oppositely moving pistons reduces engine vibration. The crankshafts may be coaxial or offset radially from each other. Power from the engine is delivered from the adjacent power output ends of the crankshafts.

35 Claims, 10 Drawing Sheets

PISTON ENGINE WITH COUNTERROTATING CRANKSHAFTS

BACKGROUND OF INVENTION

The present invention relates to a reciprocating piston engine, and particularly to an internal combustion engine including a pair of counter-rotating crankshafts.

Conventional multi-cylinder high speed internal combustion engines small enough for use in automobiles, motorcycles, and smaller applications typically utilize a single crankshaft connected to all the pistons through connecting rods. One end of the crankshaft is connected to deliver power from the engine through a clutch or torque converter. Such a crankshaft may include counterweights to balance the pistons and connecting rods, and must have sufficient torsional stiffness to withstand the torque developed by the engine. The rotating mass of the crankshaft, particularly at high speeds, results in gyroscopic forces that can significantly affect the handling characteristics of vehicles, particularly motorcycles, in which such engines are used. Any imbalance in such an engine can result in significant vibration. The engine's crankcase and cylinder block structures must therefore be sturdy enough to absorb such vibrations as well as the torque and power developed by the engine in operation.

In order to minimize the gyroscopic effects of a crankshaft, it has been known in the past to provide a pair of counter-rotating side-by-side crankshafts in an engine, with each crankshaft connected to each piston by at least one connecting rod, as shown in Hammerton, U.S. Pat. No. 5,435,232, and Wittner, U.S. Pat. Nos. 5,682,844 and 5,873,333, for example. Wittner discloses such an engine that the inventor claims is desirable for motorcycles because the crankshafts are located close together, resulting in a relatively narrow engine. Such engines, however, are of complex and costly construction.

What is desired, then, is an engine that can safely operate at high speeds, without the undesired gyroscopic effects and problems of vibration found in previously known engines, and that is not overly complex.

SUMMARY OF THE INVENTION

The present invention supplies an answer to the aforementioned shortcomings of previously known engines, by providing an engine in which a pair of counter-rotating crankshafts are aligned generally end-to-end.

In one preferred embodiment of such an engine, a plurality of cylinders are arranged generally in line with each other, with a respective piston disposed reciprocatingly within each cylinder, and with each piston connected with a respective one of the counterrotating crankshafts.

In one preferred embodiment of the invention the crankshafts are located coaxially with respect to each other.

In another preferred embodiment of the invention gears mounted on the adjacent ends of the crankshafts are meshed with each other to provide for opposite rotation of the crankshafts.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
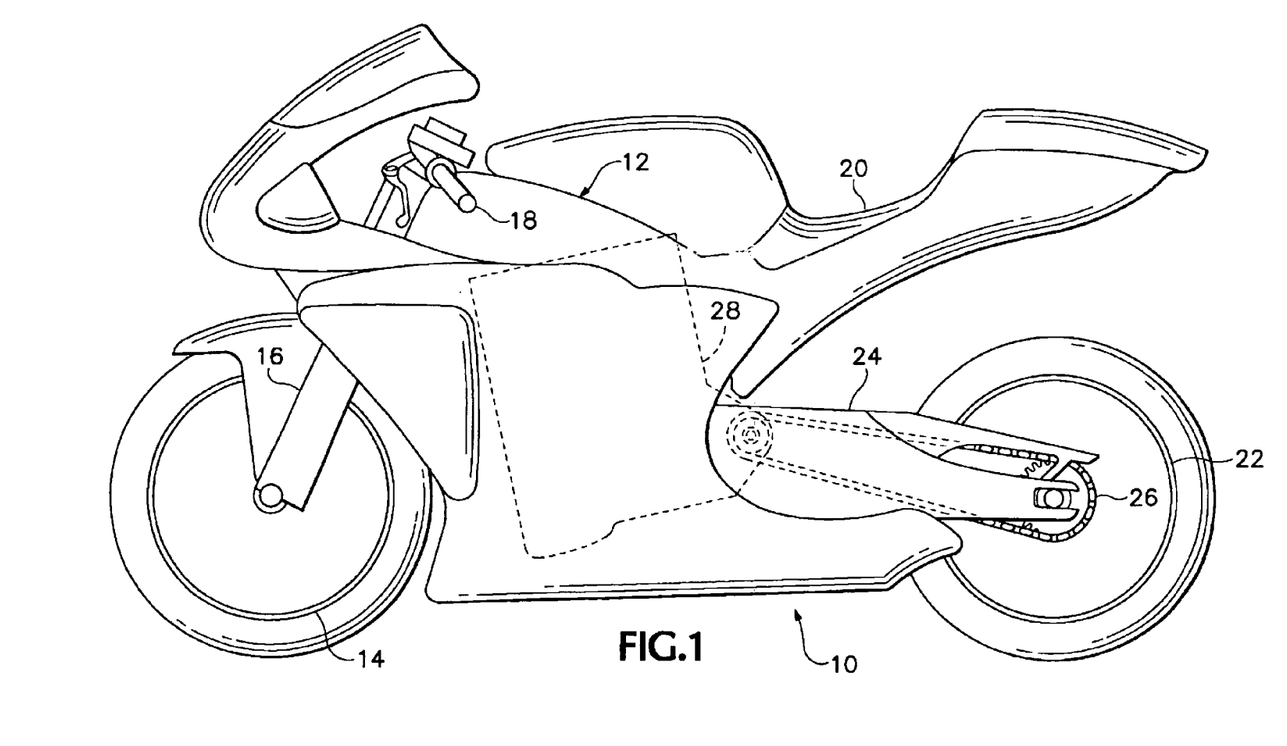
FIG. 1 is a simplified side elevational view of a motorcycle, showing in broken line the location of an engine according to the present invention together with a transmission attached thereto.

Referring now to the drawings which form a part of the disclosure herein, in FIG. 1 a motorcycle 10 includes a frame 12 supported by a front wheel 14 mounted in a front fork 16 mounted steerably on the front of the frame 12 and controlled by handlebar 18. The frame 12 supports an operator's seat 20. A driving rear wheel 22 is mounted on a swing arm 24 and driven by a chain 26 that is powered by an engine and transmission combination 28, shown schematically in broken line. It will be understood that instead of a chain 26, there might be a shaft drive, belt drive, or other final drive mechanism.

Figure 2:
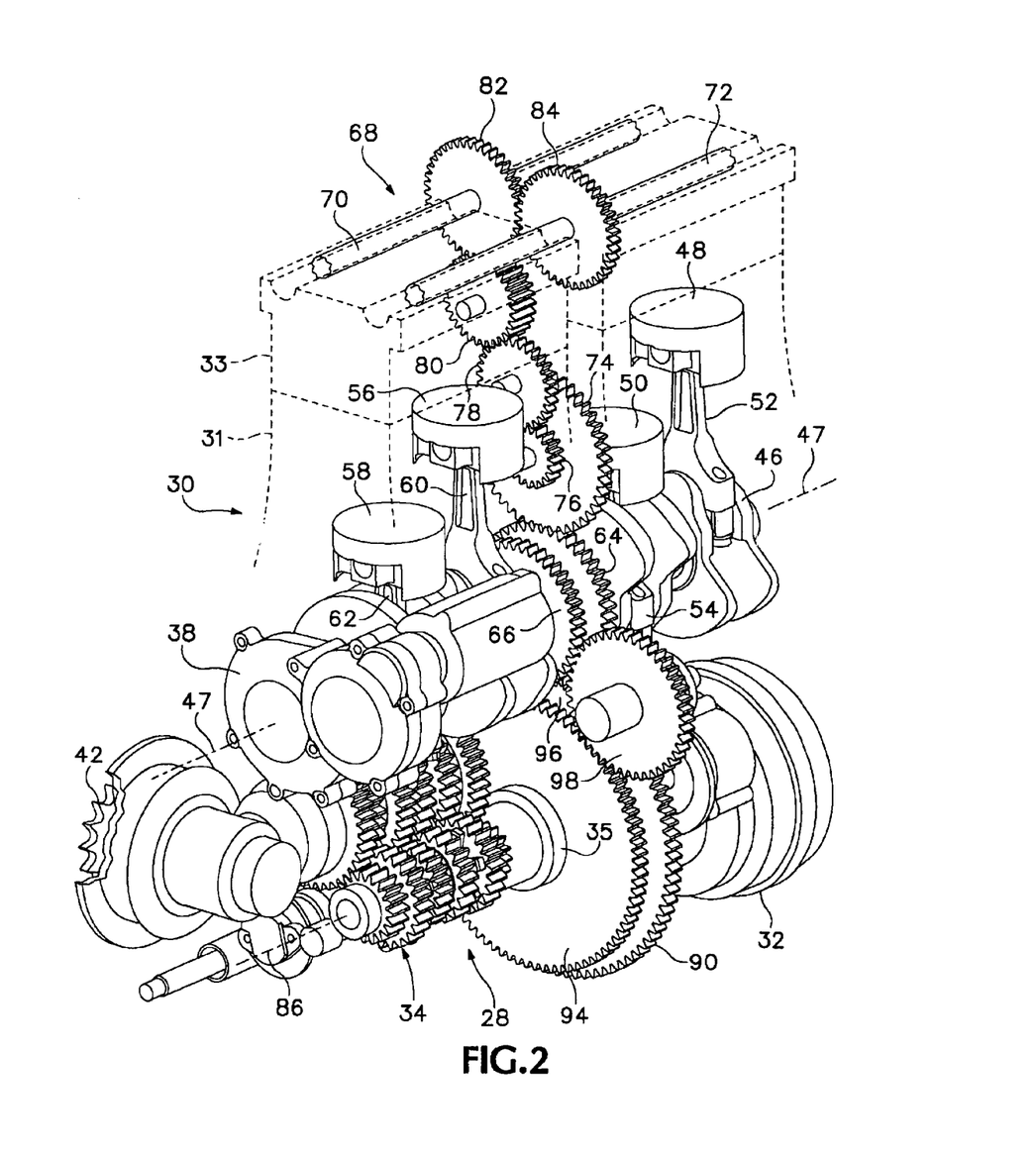
FIG. 2 is a simplified isometric view from the upper right rear of an engine embodying the present invention, together with an associated clutch and transmission.

Referring next to FIG. 2, an engine 30 is shown in greatly simplified form, with a cylinder block 31 and a cylinder head 33 shown in phantom outline and with engine valves omitted, so that the other moving parts of the engine may be seen more clearly.

Associated with the engine 30 are a clutch 32 and a transmission 34, connected to an engine output shaft 35. In the engine and transmission combination 28 as shown in the engine output shaft 35 is tubular, i.e., a torque tube connected drivingly as a power input to the clutch 32, while a separate shaft located within the torque tube delivers power from the clutch into the transmission 34.

A starter and suitable drive gearing may be provided in a housing 38. A final drive sprocket 42 for the chain 26 is driven by the transmission 34.

It is of principal importance that the engine 30 includes two oppositely rotating crankshafts aligned longitudinally with respect to each other. That is, the crankshafts are arranged generally end-to-end rather than alongside each other, with a rear crankshaft 44 and a front crankshaft 46 supported in suitable bearings (not shown) and rotating oppositely with respect to each other. The front and rear crankshafts 46 and 44 are coaxially aligned with each other along a single axis of rotation 47, as may be seen in FIGS. 2–3. The driving or power output ends of the crankshafts 44 and 46 thus face each other and are closely adjacent to each other at the middle of the length of the engine 30.

A pair of pistons, a front or number one piston 48 and a number two piston 50, are connected to the front crankshaft 46 by respective connecting rods 52 and 54. It may be seen that the respective crank throws of the crankshaft 46 are opposed, separated by 180 degrees of crankshaft rotation, so that the number one piston 48 is at top dead center while the number two piston 50 is at bottom dead center, as shown in FIG. 2.

A number three piston 56 and a number four piston 58 are similarly connected to the rear crankshaft 44 by respective connecting rods 60 and 62. The crank throws of the rear crankshaft 44 are also opposed to each other, and are in phase with those of the front crankshaft 46. The number three piston 56 is thus at top dead center when the number one piston 48 is at top dead center, and the number four piston 58 is at bottom dead center at the same time, as shown in FIG. 2. The crankshafts are shown having been rotated 180° in FIG. 3, with the pistons 48, 50, 56, and 58 being at the opposite ends of their respective strokes.

A front crankshaft output gear 64 is fastened to the power output end of the front crankshaft 46 so as to be driven by and rotate with the front crankshaft 46. A rear crankshaft output gear 66 is similarly fastened to the power output end of the rear crankshaft 44, a small distance apart from the front crankshaft output gear 64, so as to be driven by and rotate with the rear crankshaft 44. It may be seen that the front crankshaft output gear 64 is larger in diameter than the rear crankshaft output gear 66.

Figure 3:
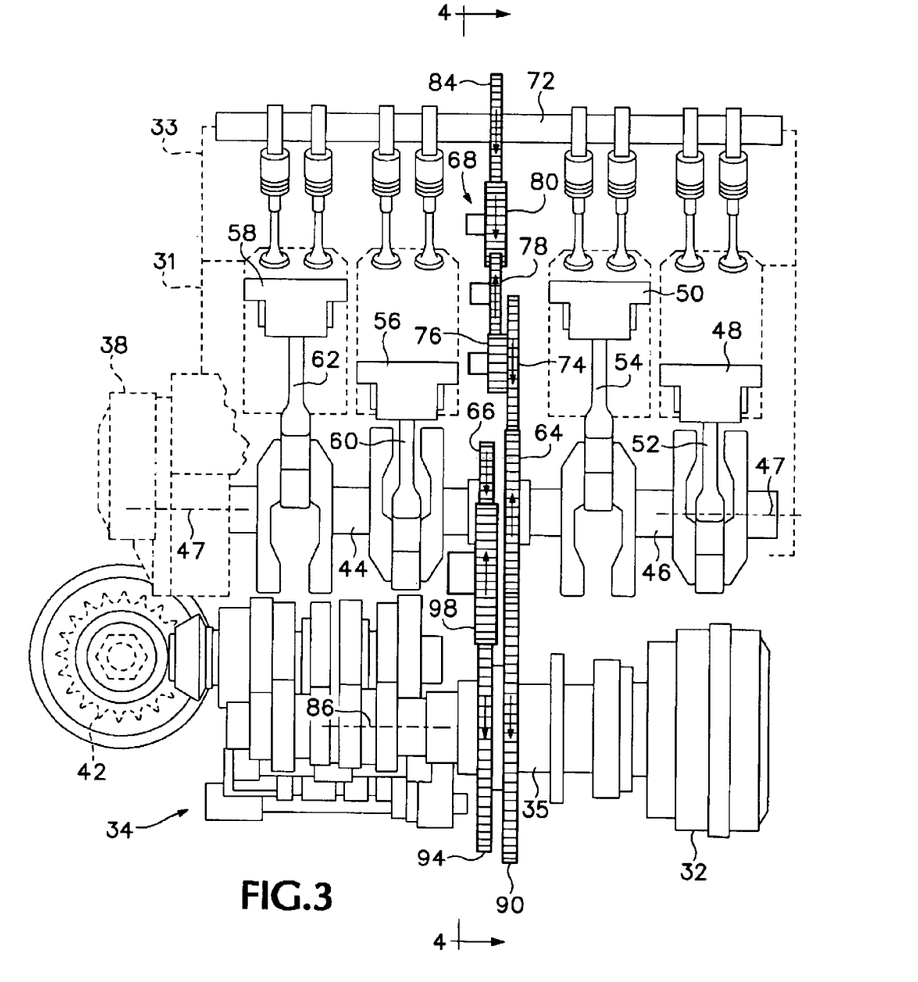
FIG. 3 is a simplified right side elevational view of the engine and transmission shown in FIG. 2.

A camshaft drive gear train 68 extends upward above the crankshaft output gears 64 and 66 and is arranged to drive a pair of camshafts 70 and 72, supported in suitable bearings (not shown) to operate respective valves in the cylinder head 33 of the engine 30, shown simplified in FIG. 3, without showing actual cam and valve positions. A reduction gear set in the drive gear train 68 includes a large input gear 74, shown meshed with the front crankshaft output gear 64, and a small output gear 76 concentric with the large gear 74 and driven to rotate along with it. The output gear 76 drives a lower intermediate idler gear 78, which in turn drives an upper intermediate idler gear 80. The upper intermediate idler gear 80 is meshed with one of a pair of camshaft drive gears. The intermediate idler gears 78 and 80 are preferably supported in adjustable bearings to accommodate head height variations, wear, and backlash.

In the embodiment shown, the upper intermediate idler gear 80 is meshed with a left camshaft drive gear 82, which is fixed on the left camshaft 70, thereby driving the left camshaft 70. The left camshaft drive gear 82 is meshed with a right camshaft drive gear 84 of the same size, drivingly fastened to the right camshaft 72. Thus both of the camshafts 70 and 72 rotate at the same angular velocity but in opposite directions. The upper intermediate idler gear 80 could, instead, be meshed with the right camshaft drive gear 84, with appropriate cam design.

The size difference between the large gear 74 and small gear 76 of the reduction gear and the size difference between the front crankshaft output gear 64 and the camshaft drive gears 82 and 84 are chosen to result in rotation of the camshafts 70 and 72 at one half the rotational speed of the crankshafts 44 and 46, for an internal combustion engine 30 using a four-stroke cycle. The spindles and bearings for the camshaft drive gear train 68 may be supported on a separate gear drive tower (not shown) fastened to the cylinder block 31 and the cylinder head 73.

It will be understood that the camshaft drive gear train 68 alternatively may be driven by the rear crankshaft output gear 66, using appropriate gear sizes.

It will also be understood that instead of the camshaft drive gear train 68, it would be possible to drive the camshafts 70 and 72 by other means such as a belt or a chain drive arrangement, or to use other valve timing and operating mechanisms (not shown).

Figure 4:
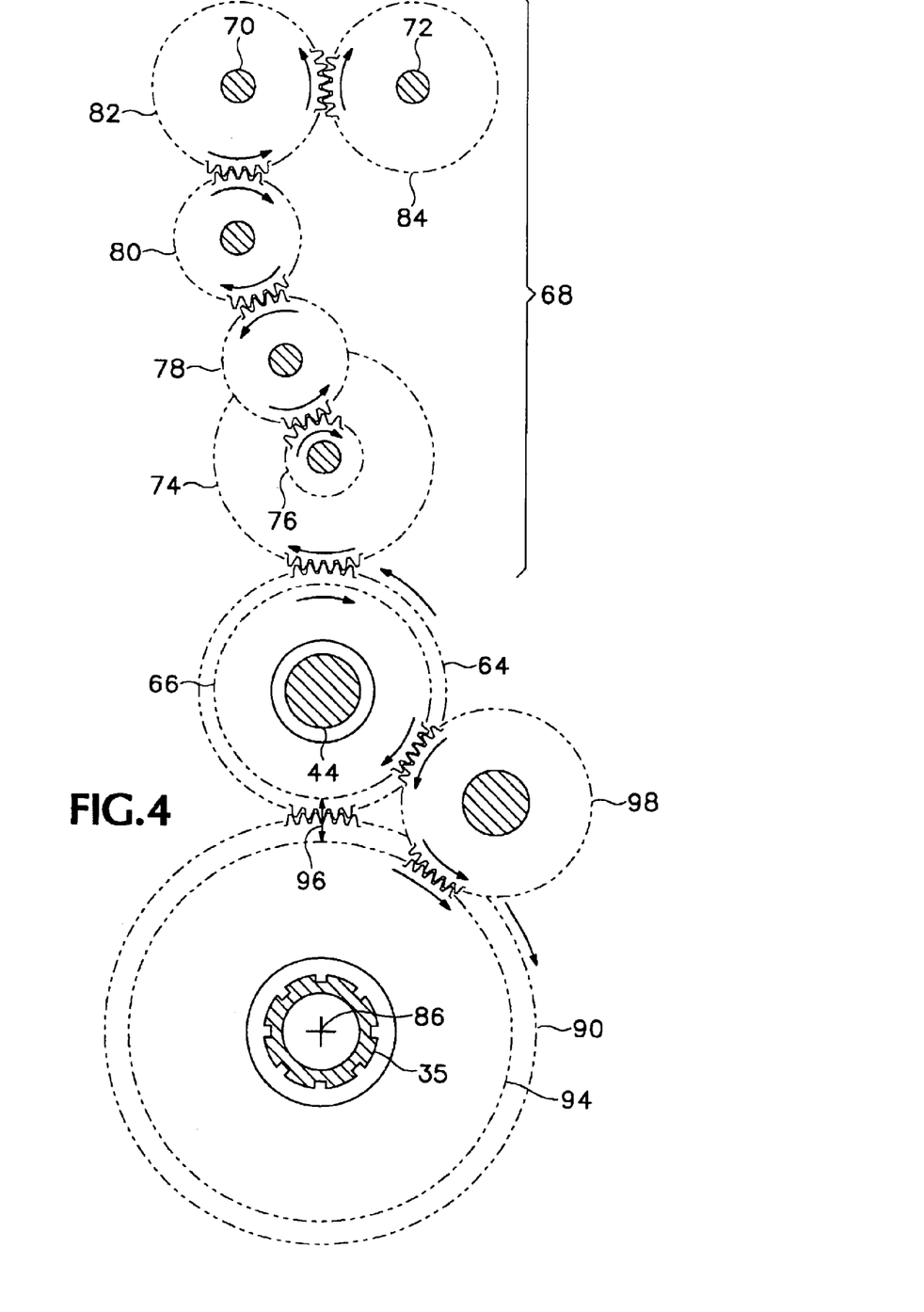
FIG. 4 is a simplified sectional view of the engine shown in FIGS. 2 and 3, taken along line 4—4 of FIG. 2, showing a crankshaft timing gear train.

As seen best in FIGS. 3 and 4, the front crankshaft output gear 64 is meshed in driving relationship with a first engine output shaft drive gear 90. The gear 90 is mounted drivingly on the engine output shaft 35 as, for example, by the use of mating splines within the hub of the gear 90 and on the outside of the engine output shaft 35, although other arrangements such as a suitable drive flange and hub combination, could be used instead. Also mounted in driving relationship with the engine output shaft 35 is a second engine output drive gear 94 that is somewhat smaller in diameter than the first engine output shaft drive gear 90. The second engine output shaft drive gear 94 is aligned with the rear crankshaft output gear 66, but since the second engine output drive gear 94 is smaller than the first engine output shaft drive gear 90 and the rear crankshaft output gear 66 is smaller than the front crankshaft output gear 64, there is a clearance 96 between the rear crankshaft output gear 66 and the second engine output shaft drive gear 94, and they do not mesh with each other.

As shown in FIGS. 2, 3, and 4, a crankshaft timing idler gear 98 is supported rotatably on suitable bearings defining an axis of rotation also parallel with the crankshaft axis of rotation 47. The crankshaft timing idler gear 98 is meshed with both the rear crankshaft output gear 66 and the second engine output shaft drive gear 94, so that they both rotate about a driven gear axis of rotation 86.

The rear crankshaft output gear 66 is smaller than the front crankshaft output gear 64, and the second engine output drive gear 94 is smaller than the first engine output drive gear 90, by the same ratio of effective diameters, with the result that the crankshaft timing idler gear 98 forces the front and rear crankshafts 46 and 44 to rotate at the same angular velocity but in opposite directions. As a result, the rotational inertia and consequent gyroscopic forces of the front and rear crankshafts 46 and 44 are essentially equal and opposite to each other, canceling each other out.

It will be understood that instead of the front crankshaft output gear 64 and the first engine output gear being the larger set of gears, the rear crankshaft output gear 66 and the second engine output drive gear 94 could be larger and be meshed with each other, while the crankshaft timing idler gear 98 could be meshed with the front crankshaft output gear 64 and the first engine output drive gear 90. It would also be feasible for both of the crankshaft output gears 64 and 66 to be the same size and for the crankshaft timing idler gear to be a reduction gear pair (not shown).

In order to avoid cyclically occurring imbalances of forces which would have to be borne by the engine output drive gears 90 and 94 and the fastenings of the hubs of those gears to the engine output torque tube 35, the number one piston 48 and number three piston 56 move reciprocally in their respective cylinders in phase with each other, and with their operating cycles in phase with each other, so that both the number one piston 48 and the number three piston 56 experience a power stroke simultaneously. Similarly, the number two piston 50 and number four piston 58 move reciprocally in phase with each other and with their power cycles in phase with each other.

While there may be some unbalanced rotational inertia from the transmission itself, because its counterrotating shafts and gears may not be symmetrical and probably are not rotating at equal speeds, so that there can be some resulting net gyroscopic effect, the unbalanced rotational inertia of the transmission is very much less than that of each crankshaft, since the crankshafts are more massive, larger in diameter, and rotating at higher speeds.

Because the front and rear crankshafts 46 and 44 are significantly shorter than the length of a single crankshaft for an in-line engine having the same number of cylinders as in a conventional engine, each crankshaft 46 or 44 is subjected to smaller torsional loading and is twisted less over its full length than a single longer crankshaft would be. As a result, each of the front and rear crankshafts 46 and 44 of the engine 30 can be smaller in diameter and consequently lighter in weight, using smaller bearings and thus producing less friction.

Since the two pistons connected with one of the crankshafts are always moving opposite each other, the reciprocating masses of the pistons connected with each crankshaft of the engine 30 balance each other. At the same time, since the front and rear crankshafts 46 and 44 rotate in opposite directions, the lateral component of the movement of the connecting rod and crank associated with a piston on one crankshaft is opposite to and counterbalances the lateral component of movement of the corresponding engine parts associated with the same-phase piston on the opposite one of the crankshafts 46 and 44. The result is a counterbalancing and minimization of vibration and gyroscopic effects of the entire engine, as the torque applied by each crankshaft against the block and frame of the engine balances that of the other. While in an engine having a single crankshaft the entire engine block generally oscillates angularly around the crankshaft, the engine 30 has a greatly reduced tendency to oscillate, as a result of the counterrotation of the two crankshafts 46 and 44.

Preferably, equal numbers of cylinders and their associated pistons are associated with both of the counterrotating crankshafts of such an engine, in order to provide all the available advantageous effects on engine balance. When the same even number of similar cylinders and pistons are associated with each of the counterrotating crankshafts, with the cranks arranged so that each piston moves in the opposite direction from another piston on the same crankshaft, and with each piston moving in the same direction and in the same phase of its power cycle as a counterpart piston connected with the other crankshaft, several advantages are obtained. First, the primary reciprocating masses and forces of each piston are counterbalanced by those of another piston moving in the opposite direction. Secondary rotational forces, resulting from the lateral components of acceleration and movement of each connecting rod and crank pin, are balanced by equal and opposite secondary forces of an oppositely rotating crank pin of the other of the counterrotating crankshafts and its associated connecting rod. Third, the gyroscopic forces of the pairs of counterrotating crankshafts and camshafts oppose and counterbalance one another. As a result, the engine 30 as a unit runs with very little vibration, yet needs no heavy counterweights on its crankshafts 44 and 46. When a transmission such as the transmission 34 includes a pair of counterrotating shafts and gear sets a similar effect of balancing of gyroscopic forces within the transmission is also obtained.

Nevertheless, at least a major benefit of the is counterrotating crankshafts is available even without the numbers and sizes of cylinders and pistons being balanced between the two counterrotating crankshafts.

It is to be understood, then, that an engine including a pair of counterrotating crankshafts according to this invention may have any desired number of cylinders and pistons and may be employed for a large variety of other end uses, such as automobiles, off-road motorcycles, boats and personal watercraft, aircraft, and other vehicles.

Also of importance in this engine is the centrally-located arrangement of gears and shafts in the engine and engine block 31 and the associated transmission structures. This arrangement allows the structural components of the engine casings to be reinforced in the central portion which supports the bearings for the power output ends of crankshafts and the drive train for the camshafts, and affords significant reduction in the thickness and weight of the outer portions of the engine case structures.

Figure 5:
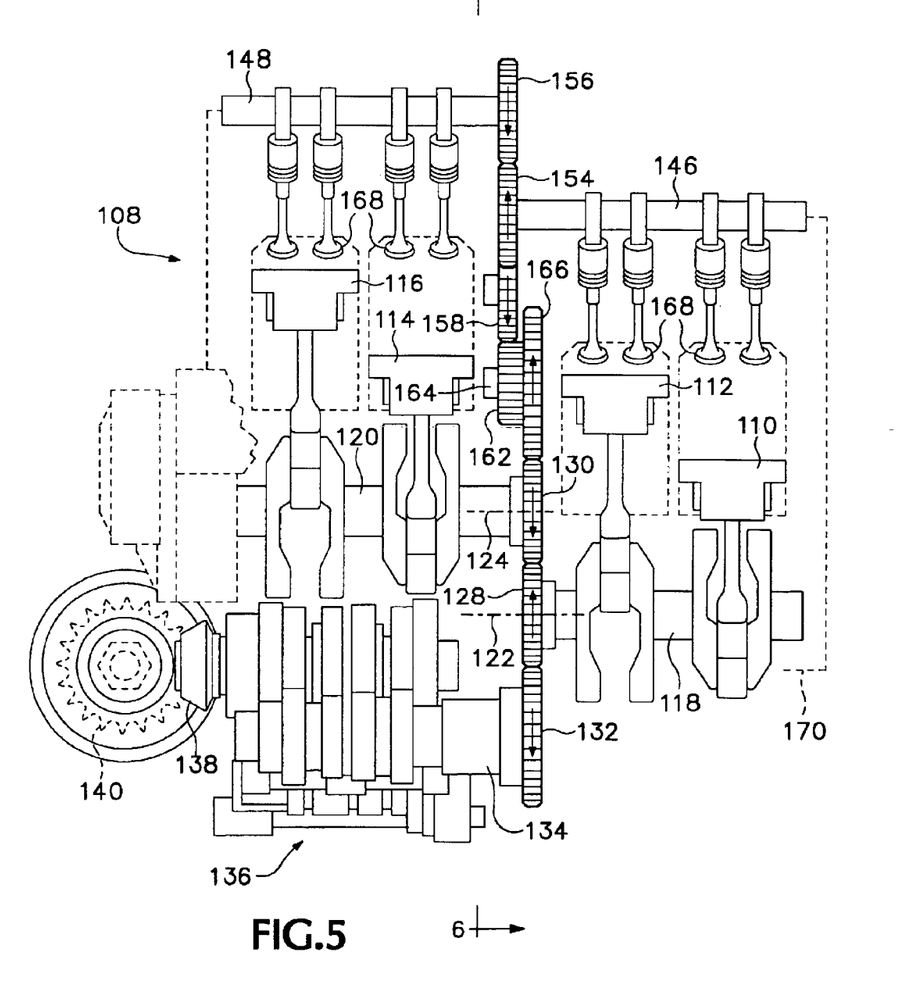
FIG. 5 is a simplified right side elevational sectional view of an engine which is an alternative embodiment of the present invention, together with a transmission driven by the engine.
Figure 6:
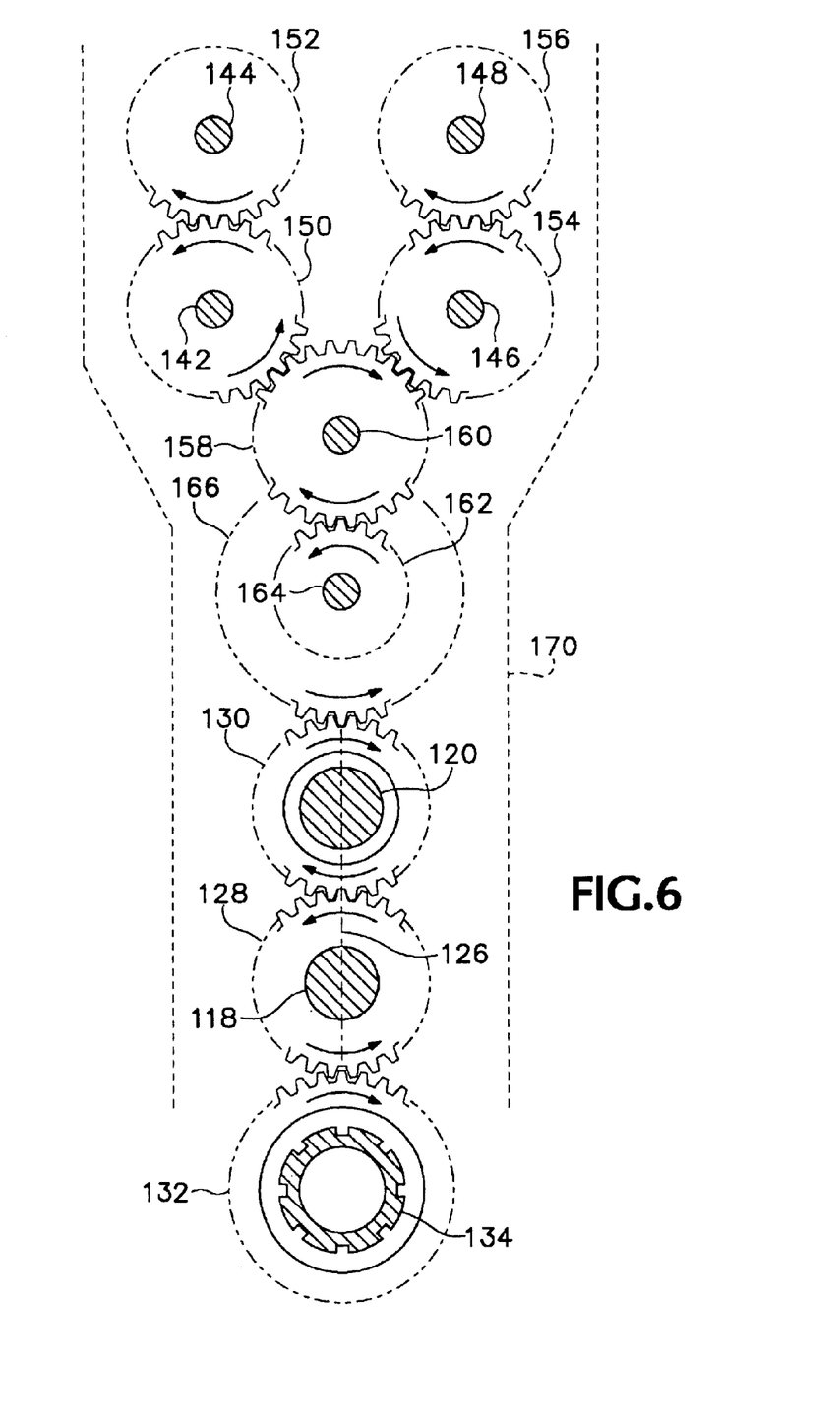
FIG. 6 is a sectional view of the engine shown in FIG. 5, taken along line 6—6 in FIG. 5.
Figure 7:
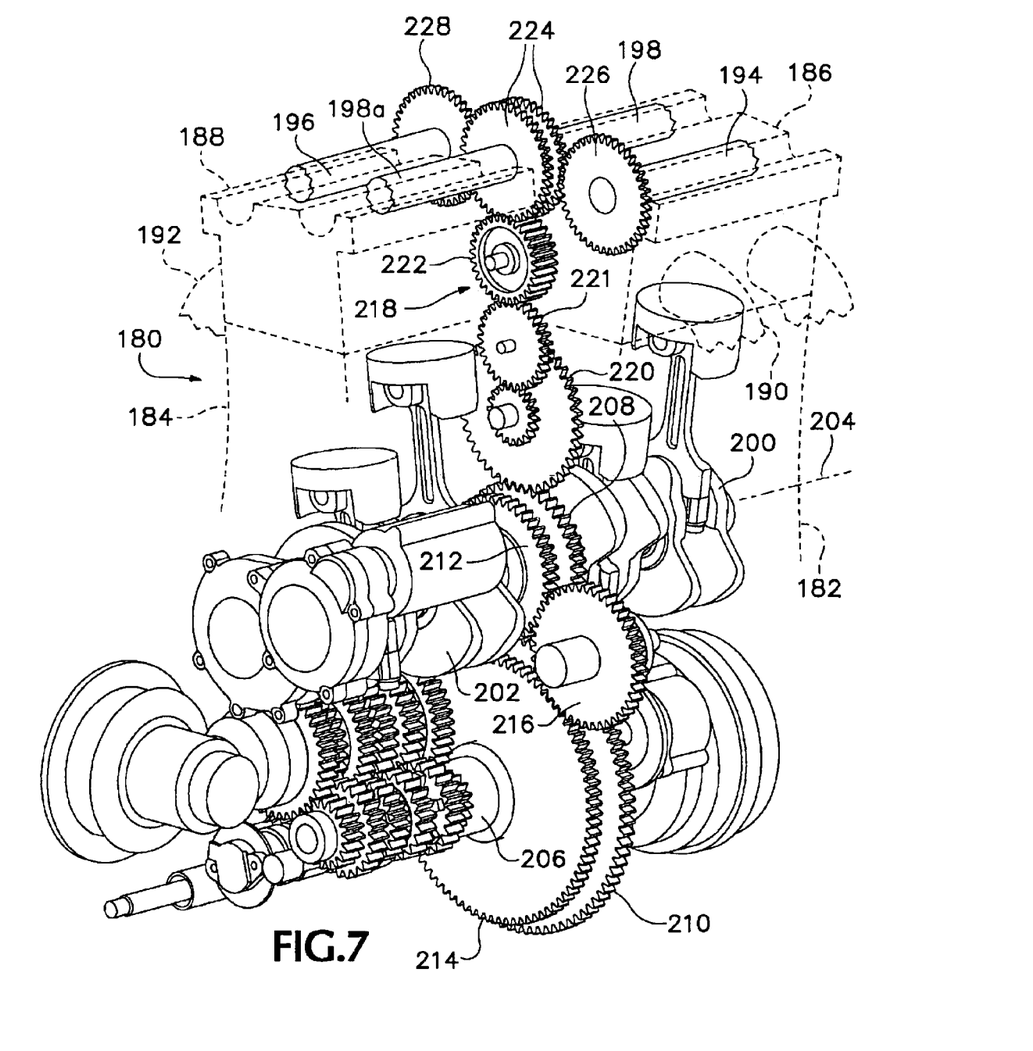
FIG. 7 is a simplified isometric view taken from the upper right rear of an engine which is another alternative embodiment of the present invention.
Figure 8:
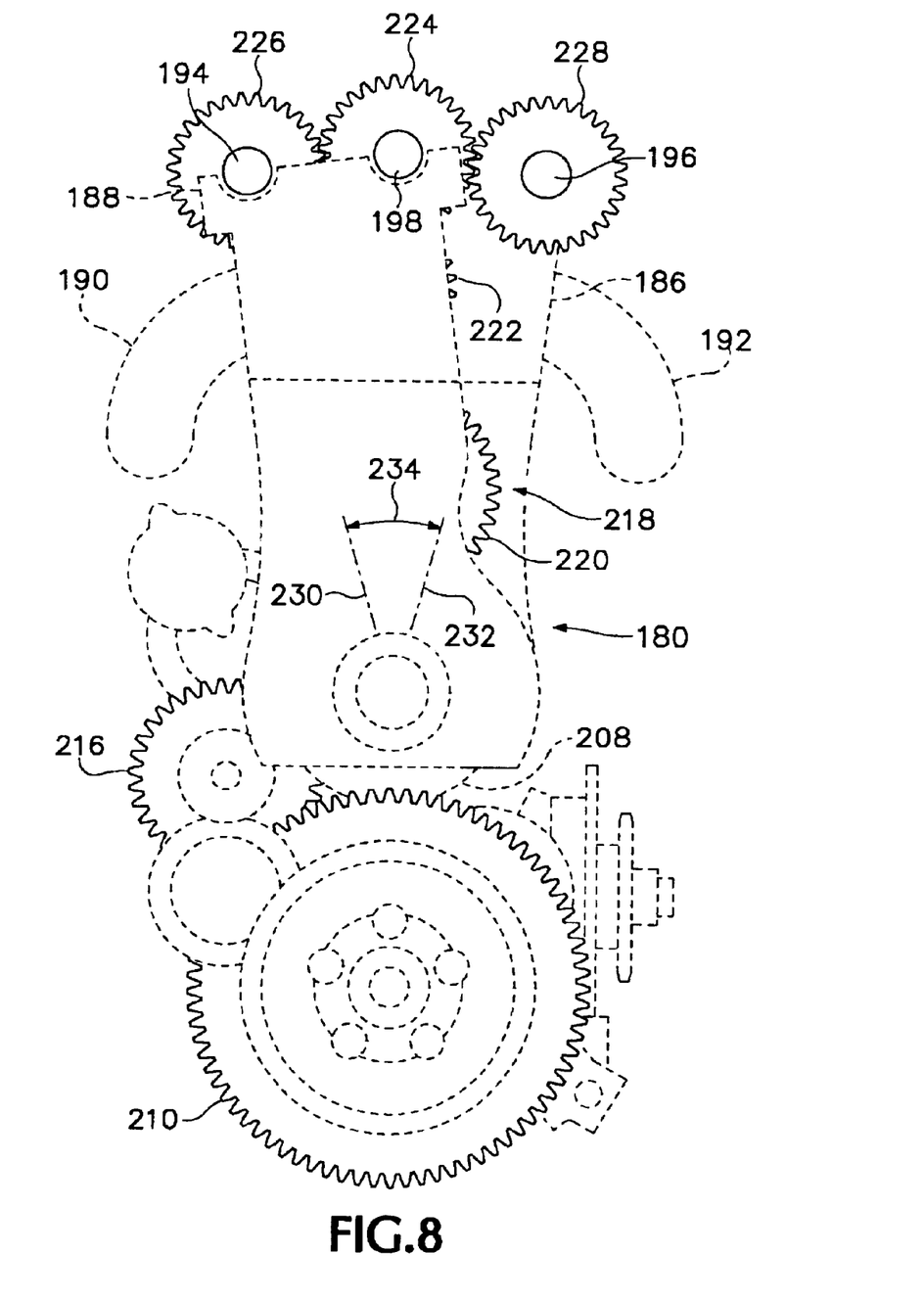
FIG. 8 is a simplified front elevational view of the engine shown in FIG. 7.
Figure 9:
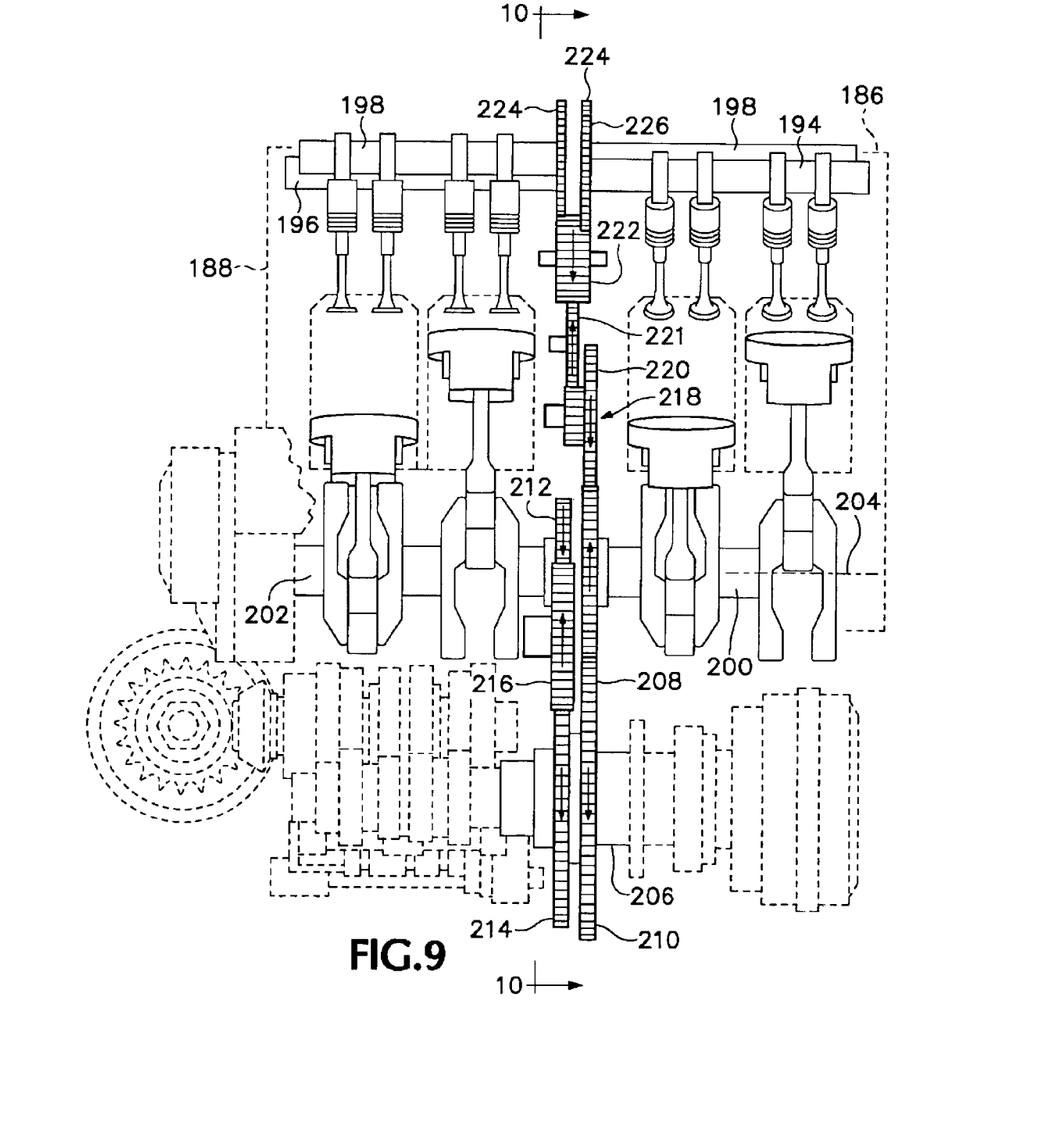
FIG. 9 is a simplified right side elevational view of the engine shown in FIG. 7.
Figure 10:
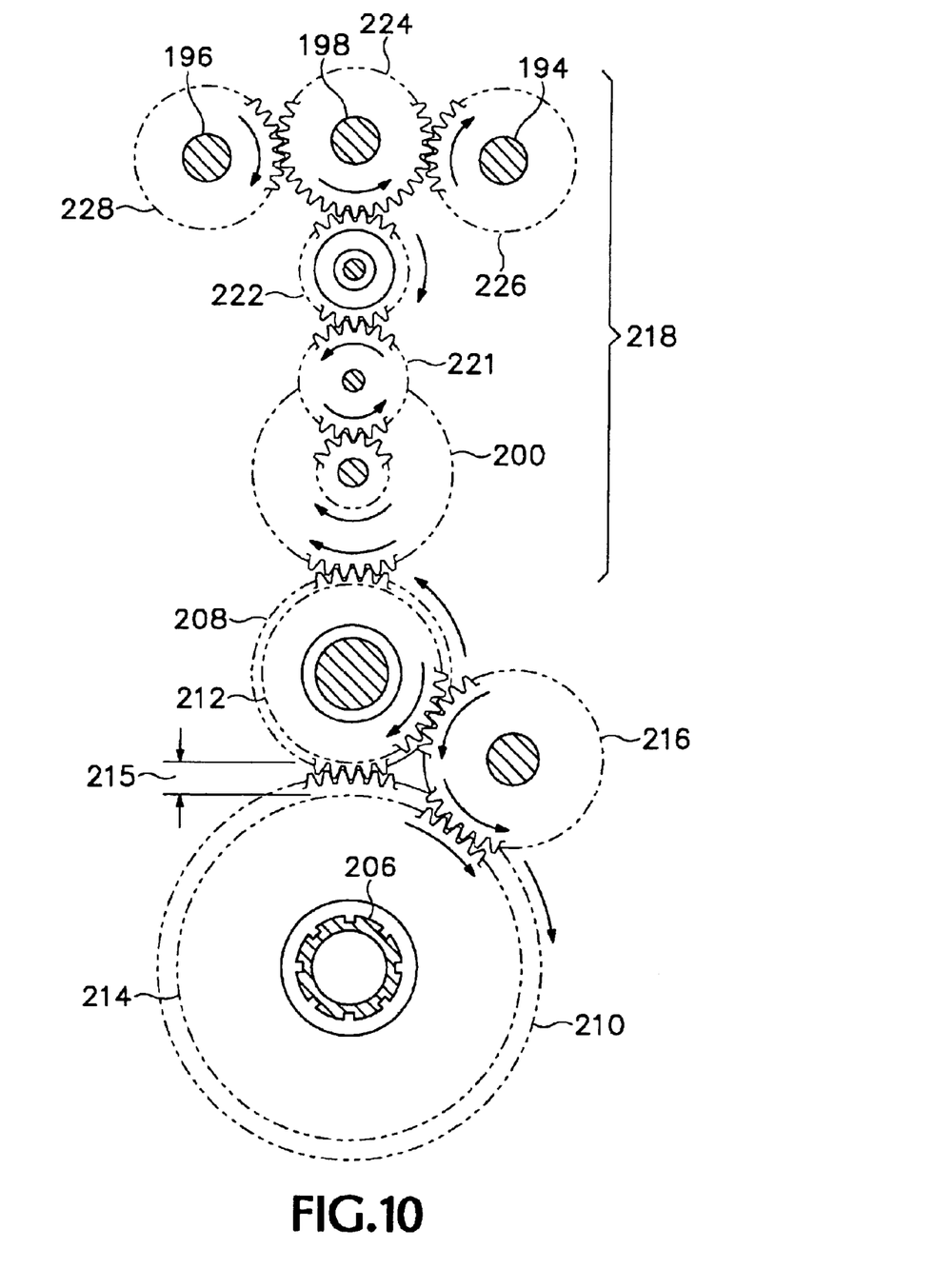
FIG. 10 is a simplified sectional view of the engine shown in FIGS. 7, 8 and 9, taken along line 10—10 in FIG. 9.

In FIGS. 5 and 6, another engine and transmission combination illustrates an alternative embodiment of the present concept. FIG. 5 depicts an in-line, four cylinder, four stroke internal combustion engine 108 containing reciprocating pistons 110, 112, 114, and 116. Pistons 110 and 112 are coupled through conventional connecting rods to drive a crankshaft 118, and pistons 114 and 116 are similarly coupled to a second crankshaft 120. The crankshafts 118 and 120 are displaced vertically from each other, but their axes of rotation 122 and 124 are parallel and disposed in the same vertical plane 126 (FIG. 6), and all the cylinders preferably are also aligned with each other and with the same vertical plane 126. Pistons 110 and 114 are shown at bottom dead center positions and pistons 112 and 116 are shown at the top dead center positions.

Crankshafts 118 and 120 are coupled together and timed with each other through equal-sized gears 128 and 130 meshed together on their adjacent output ends, and the two crankshafts therefore rotate at equal speeds, but in opposite directions. This counter-rotation effectively cancels nearly all gyroscopic and other internal torque forces on the engine block, and when such an engine used in a motorcycle, the elimination of gyroscopic effects significantly improves handling for turning and banking. The crankshaft output gear 128 is meshed with a transmission input drive gear 132 connected to an input shaft 134 driving a transmission 136. An output shaft 138 and drive sprocket 140 deliver power from the transmission 136 to a drive chain such as the drive chain 26 of the motorcycle 10 shown in FIG. 1.

The dual overhead camshafts 142, 144, 146, and 148 also are provided in counter-rotating pairs. Camshafts 142 and 144 are coupled together through gears 150 and 152 to effect counter-rotation, and camshafts 146 and 148 are similarly coupled together through gears 154 and 156 for counter-rotation. Gears 150 and 154 are meshed with and driven by an idler gear 158 mounted on a shaft 160. The idler gear 158 is meshed with and driven by a smaller gear 162 of a reduction gear pair, mounted on a shaft 164 for rotation together with the larger gear 166 of the reduction gear pair. The gear 166 is meshed with and driven by the upper crankshaft output gear 130 and is coupled with and rotates the smaller output gear 162. The sizes of the various gears are chosen to effect a speed reduction that drives the camshafts 142, 144, 146, and 148 at one half the crankshaft speed and coordinates operation of the engine valves 168 with movement of the pistons.

As in the engine 30, providing crankshafts and camshafts of half the total length of the engine 108 effectively reduces torsional loading imposed on each shaft and correspondingly reduces pressure applied to each. This allows for lighter weight crankshafts and camshafts and smaller bearings, contributing to a more efficient engine.

The arrangement of split crankshafts and camshafts and gears also contributes significantly to the reduction of the lateral dimension of the engine case structure 170, as evidenced in FIG. 6. For motorcycle, aircraft, and watercraft applications, this contributes beneficially to a reduction of the vehicle width and particularly the width of a motorcycle body which the operator must straddle, and improves the steering and other handling performance of the motorcycle. The engine is balanced as to both reciprocating and rotational masses without need for heavy counterbalancing. The engine operates more smoothly with fewer stresses, while affording the benefits of minimizing weight and dimensions.

Turning to FIGS. 7, 8, 9, and 10, an engine 180 is a further alternative embodiment of the present invention. The engine 180 includes a cylinder block assembly including a front, or first portion 182 and a rear or second portion 184. A first or front cylinder head 186 is fastened to the first portion 182 of the cylinder block, and a cylinder head 188 is fastened to the second portion 184 of the cylinder block. An exhaust header 190 is attached to the first, or front cylinder head 186, and a pair of exhaust headers 192 are attached to the rear or second cylinder head 188. An exhaust valve camshaft 194 is supported in suitable bearings in the cylinder head 186 and an exhaust valve camshaft 196 is similarly mounted in the second, or rear, cylinder head 188. An inlet valve camshaft 198 is supported in suitable bearings in each of the cylinder heads 186 and 188.

For the sake of simplicity the cams and camshaft bearings are not shown with particularity. It will be understood that suitable camshaft covers and bearings will be attached to the cylinder head portions 186 and 188 to support and protect the camshafts.

While two separate camshafts 198 and 198a are shown, each with a respective drive gear 224 mounted at their adjacent ends between the cylinder heads 186 and 188, it will be understood that the camshaft may be constructed as a single camshaft 198, if desired.

As in the engine 30 described previously, the engine 180 has two oppositely-rotating crankshafts, a front crankshaft 200 and a rear crankshaft 202, arranged end-to-end and supported for rotation in opposite directions about a common axis of rotation 204. An engine output shaft or torque tube 206 is driven by both of the crankshafts 200 and 202 in the same manner used in the engine 30, with a front crankshaft output gear 208 meshed with a first engine output shaft drive gear 210. A rear crankshaft output gear 212 is smaller than the front crankshaft output gear 208, and the diameter of a rear or second engine output shaft drive gear 214 is smaller than the first engine output shaft drive gear 210 by the same size ratio. This provides clearance 215 (FIG. 10) between the gears 212 and 214, which are both meshed with a crankshaft timing and idler gear 216 causing the rear crankshaft 202 to rotate oppositely, but at the same angular velocity as the front crankshaft 200.

As in the engine 30, each of the crankshafts 200 and 202 has two opposed crank throws, each connected to a respective piston, and the cranks are timed with respect to each other to have one piston at top dead center and the other piston at bottom dead center, in the same phase of their respective power cycles, simultaneously.

A camshaft drive gear train 218 is located between the front and rear block portions 182 and 184 of the cylinder block assembly and includes a reduction gear pair 220, an intermediate idler gear 221, an upper idler gear 222, and an inlet camshaft driven gear 224 meshed with one another and providing for rotation of the inlet camshafts 198 and 198a at one-half the speed of revolution of the crankshafts 200 and 202. The exhaust camshafts 194 and 196 are driven respectively by camshaft drive gears 226 and 228, both meshed with the inlet cam driven gear 224 to rotate oppositely and at the same speed as the inlet camshafts 198 and 198a.

The first portion 182 and second portion 184 of the cylinder block assembly define respective cylinders, with a cylinder bore axis 230 of the first portion 182, at an appropriate angle 234 with respect to the bore axis 232 of the cylinders of the second portion 184, to provide such alignment of the camshafts. The angle 234 between the block portions 182 and 184 also opens more desirable paths for the flow of intake air to the intake sides and the flow of exhaust gases from the outlet valve sides of the front and rear cylinder heads 186 and 188, to make the engine 180 more efficient for use in a motorcycle.

While the engines 30, 108, and 180 have been shown as four-cylinder engines, it will be understood that engines with similarly counterrotating crankshafts can have as few as two cylinders or more than four cylinders, as may be desired in use of such engines in vehicles larger than motorcycles, or to power boats.

It will also be understood that while the crankshafts of the engines 30 and 180 have been shown associated with a transmission input or engine output torque tube 35 or 206 in a particular arrangement, the engine power output shaft could be arranged in various other ways to deliver power from such an engine without departing from the concept of the present invention.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A reciprocating piston engine, comprising:
   (a) a cylinder block;
   (b) at least two cylinders defined in said cylinder block;
   (c) two longitudinally adjacent crankshafts arranged substantially end-to-end and supported with respect to said cylinder block for rotation about respective parallel crankshaft axes of rotation, at least one of said cylinders being associated with each one of said crankshafts;
   (d) a respective piston movable reciprocatingly in each said cylinder, each said respective piston being interconnected with the one of said crankshafts with which each said cylinder is associated; and
   (e) a crankshaft timing mechanism interconnecting said two adjacent crankshafts with each other and requiring said crankshafts to rotate oppositely.

2. The engine of claim 1 wherein said crankshafts are interconnected by said crankshaft timing mechanism so that one said piston interconnected with one of said two adjacent crankshafts moves in phase with another said piston interconnected with the other of said crankshafts.

3. The engine of claim 1 including two cylinders and two pistons associated with each of said crankshafts.

4. The engine of claim 1 wherein said crankshafts are aligned coaxially with each other.

5. The engine of claim 4 including two cylinders and two pistons associated with each of said crankshafts.

6. The engine of claim 5 wherein both of said cylinders associated with one of said crankshafts are located alongside each other in a single plane.

7. The engine of claim 4, each of said crankshafts having an output end and having a respective crankshaft output gear mounted on said output end, said crankshaft timing mechanism including a reversing gear combination interconnecting said crankshaft output gears with each other and requiring said crankshafts to rotate oppositely.

8. The engine of claim 4 wherein a first one of said crankshafts has a first crankshaft output gear mounted on its output end, and the other of said pair of crankshafts has a second crankshaft output gear mounted on its output end, said first crankshaft output gear being larger than said second crankshaft output gear by a predetermined ratio, said first crankshaft output gear being meshed with a first driven gear, a second driven gear being fastened to said first driven gear for rotation coaxially therewith about a driven gear axis of rotation, said second driven gear being smaller than said first driven gear by said predetermined ratio, and a crankshaft timing idler gear being meshed with both said second output gear and said second driven gear for rotation about an idler gear axis of rotation.

9. The engine of claim 8 wherein said first and second driven gears are mounted for rotation together about a common axis.

10. The engine of claim 1 wherein said cylinder block includes a first block portion associated with a first one of said crankshafts and a second block portion associated with a second one of said crankshafts, an axis of a cylinder being defined by said first block portion being oriented at a predetermined angle with respect to an axis of a cylinder defined by said second block portion.

11. The engine of claim 1 wherein all of said cylinders are aligned with each other in a single plane.

12. The engine of claim 1 wherein each of said crankshafts has a power output end, said power output ends of said crankshafts being located adjacent to each other.

13. The engine of claim 12 including a pair of valve-operating camshafts rotating oppositely with respect to each other and driven through a camshaft driving mechanism associated with said power output end of one of said crankshafts.

14. The engine of claim 13 wherein said driving mechanism includes a speed reduction gear train.

15. The engine of claim 13 wherein each of said camshafts of said pair has a pair of opposite ends and is driven rotationally by said camshaft drive mechanism at a central location between said ends thereof.

16. The engine of claim 1 wherein each of said crankshafts has an output end and said crankshaft timing mechanism includes a respective crankshaft output gear on said output end of each of said crankshafts, said crankshaft output gears being meshed with each other and thereby requiring said crankshafts to rotate oppositely.

17. An engine comprising:
at least one engine block;
a first crankshaft coupled to the at least one engine block;
a second crankshaft coupled to the first crankshaft in a generally end-to-end configuration such that the first and second crankshafts rotate in opposite directions;
a first piston coupled to the first crankshaft; and
a second piston coupled to the second crankshaft.

18. The engine of claim 17 wherein:
the first and second crankshafts are substantially coaxial.

19. The engine of claim 17 wherein:
the first piston reciprocates in a first plane; and
the second piston reciprocates in a second plane different than the first plane.

20. The engine of claim 19 wherein:
the first and second planes intersect substantially at the crankshafts.

21. The engine of claim 20 wherein:
the at least one engine block and the first and second planes comprise a V engine.

22. The engine of claim 21 wherein:
the V is between 5 and 15 degrees.

23. The engine of claim 17 wherein:
the first crankshaft includes a gear at an end adjacent the second crankshaft; and
the second crankshaft includes a gear at an end adjacent the first crankshaft and engaged with the gear of the first crankshaft.

24. The engine of claim 17 further comprising:
a third piston coupled to the first crankshaft; and
a fourth piston coupled to the second crankshaft.

25. The engine of claim 24 wherein:
the first crankshaft has a shape such that the first and third pistons are substantially 180 degrees out of phase; and
the second crankshaft has a shape such that the second and fourth pistons are substantially 180 degrees out of phase.

26. The engine of claim 25 wherein:
the first and second crankshafts are coupled together such that the first piston and one of the second and fourth pistons are substantially in phase, and the third piston and the other of the second and fourth pistons are substantially in phase.

27. The engine of claim 26 wherein:
the third and second pistons are adjacent each other in a middle of the four pistons, and the first and fourth pistons are at respective opposite outer ends of the crankshafts; and
the third and second pistons are substantially in phase.

28. A motorcycle having a longitudinal direction of travel and comprising:
a frame;
a rear wheel coupled to the frame;
a front wheel coupled to the frame; and
an engine coupled to the frame and including,
a block,
a plurality of pistons reciprocatingly disposed within the block,
a crankcase coupled to the block,
a first crankshaft rotatingly disposed within the crankcase,
a second crankshaft rotatingly disposed within the crankcase substantially end-to-end with the first crankshaft and coupled to the first crankshaft so as to rotate in an opposite direction as the first crankshaft,
at least one first connecting rod connecting a corresponding number of the pistons to the first crankshaft, and
at least one second connecting rod connecting a corresponding number of the pistons to the second crankshaft.

29. The motorcycle of claim 28 wherein:
the first and second crankshafts are substantially parallel to the longitudinal direction of travel.

30. The motorcycle of claim 28 wherein:
the plurality of pistons includes four pistons;
the at least one first connecting rod includes two connecting rods connecting a first and a second piston, respectively, to the first crankshaft; and the at least one second connecting rod includes two connecting rods connecting a third and a fourth piston, respectively, to the second crankshaft.

31. The motorcycle of claim 30 wherein:

the first and second pistons reciprocate substantially out of phase with each other; and the third and fourth pistons reciprocate substantially out of phase with each other.

32. The motorcycle of claim 31 wherein:

the second and third pistons reciprocate substantially in phase with each other.

33. The motorcycle of claim 32 wherein:

the second and third pistons are adjacent each other; and the first and fourth pistons are at respective opposite ends of the four pistons.

34. The motorcycle of claim 33 further comprising:

intake and exhaust valves associated with each of the four pistons; and valves of at least one of (i) the second and third pistons, and (ii) the first and fourth pistons are operated substantially in phase;

whereby a "big bang" configuration is achieved.

35. The motorcycle of claim 34 wherein both:

valves of the second and third pistons are operated substantially in phase; and valves of the first and fourth pistons are operated substantially in phase.

* * * * *